United States Patent [19]

Jones, III

[11] 4,205,654
[45] Jun. 3, 1980

[54] SOLAR ENERGY UNIT

[76] Inventor: John M. Jones, III, Box 704, Davenport, Fla. 33837

[21] Appl. No.: 832,175

[22] Filed: Sep. 9, 1977

[51] Int. Cl.² .............................................. F24J 3/02
[52] U.S. Cl. ..................................... 126/440; 126/443
[58] Field of Search ............................... 126/270, 271

[56] References Cited

U.S. PATENT DOCUMENTS

| | | | |
|---|---|---|---|
| 2,167,576 | 7/1939 | Kiser | 126/271 |
| 2,213,894 | 9/1940 | Barry | 126/271 |
| 3,244,186 | 4/1966 | Thomason et al. | 126/270 |
| 3,991,742 | 11/1976 | Gerber | 126/271 |
| 4,057,048 | 11/1977 | Maine | 126/271 |
| 4,069,812 | 1/1978 | O'Neill | 126/271 |

*Primary Examiner*—Carroll B. Dority, Jr.
*Attorney, Agent, or Firm*—Clarence A. O'Brien; Harvey B. Jacobson

[57] ABSTRACT

A solar energy collection device, the present invention provides a transparent housing formed in the shape of a pyramid, a fluid being directed through the interior of the pyramid for absorption of heat energy concentrated within the interior of said pyramid by the walls thereof.

5 Claims, 2 Drawing Figures

SOLAR ENERGY UNIT

BACKGROUND AND SUMMARY OF THE INVENTION

Solar collection devices typically employ reflective mirrors, lenses, and the like, for concentrating solar energy and directing the energy into a collector, such collectors typically taking the form of a heat exchange coil receiving water or other fluid therethrough. Patents have previously been issued for semispherical transparent dome-like and tent-like devices which receive solar energy within the interior thereof for utilization by heating of a fluid passing through the interior of such devices.

The following U.S. patents disclose solar energy collection devices:

U.S. Pat. Nos.
2,213,894—Sept. 3, 1940
2,859,745—Nov. 11, 1958
2,987,961—June 13, 1961
3,077,190—Feb. 12, 1963
3,118,437—Jan. 21, 1964
3,171,403—Mar. 2, 1965
3,179,105—Apr. 20, 1965
3,182,654—May 11, 1965
3,469,902—Sept. 30, 1969.

The present invention provides an improved device for collecting and concentrating the energy provided by the sun, solar radiation being received through the walls of a transparent pyramidal housing according to the invention and being converted to heat energy therewithin. The heat energy is transferred to a fluid, such as water or air, which enters the pyramidal housing through an inlet pipe and exists the housing through an outlet pipe. A sealed fluid flow system disposed within the pyramidal housing is formed of materials having high heat conductivity properties, the heat energy being transferred through the walls of said flow system in order to elevate the temperature of the fluid flowing within said system. The pyramidal housing itself is also sealed from ambient in order to more efficiently retain the heat energy therewithin.

Accordingly, it is an object of the present invention to provide a solar energy collector capable of long life.

It is a further object of the invention to provide a sealed pyramidal housing formed of transparent material and having fluid inlet and outlet means provided therein, a fluid being circulated within the housing for absorption of heat energy concentrated within the housing.

These together with other objects and advantages which will become subsequently apparent reside in the details of construction and operation as more fully herein described and claimed, reference being had to the accompanying drawings forming a part hereof, wherein like numerals refer to like parts throughout.

DESCRIPTION OF THE PREFERRED EMBODIMENT

Figure 1:
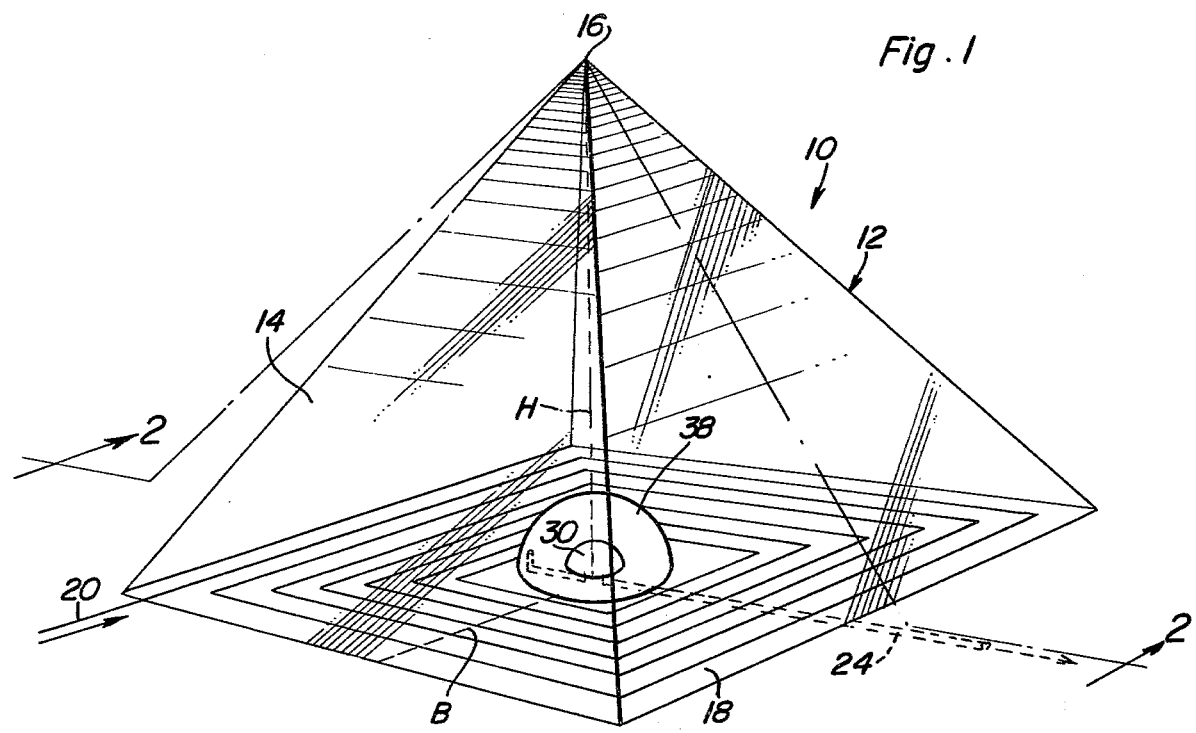
FIG. 1 is a perspective view of the present solar energy collection device; and, FIG. 2 is an elevational view in section taken along line 2—2 of FIG. 1.
Figure 2:
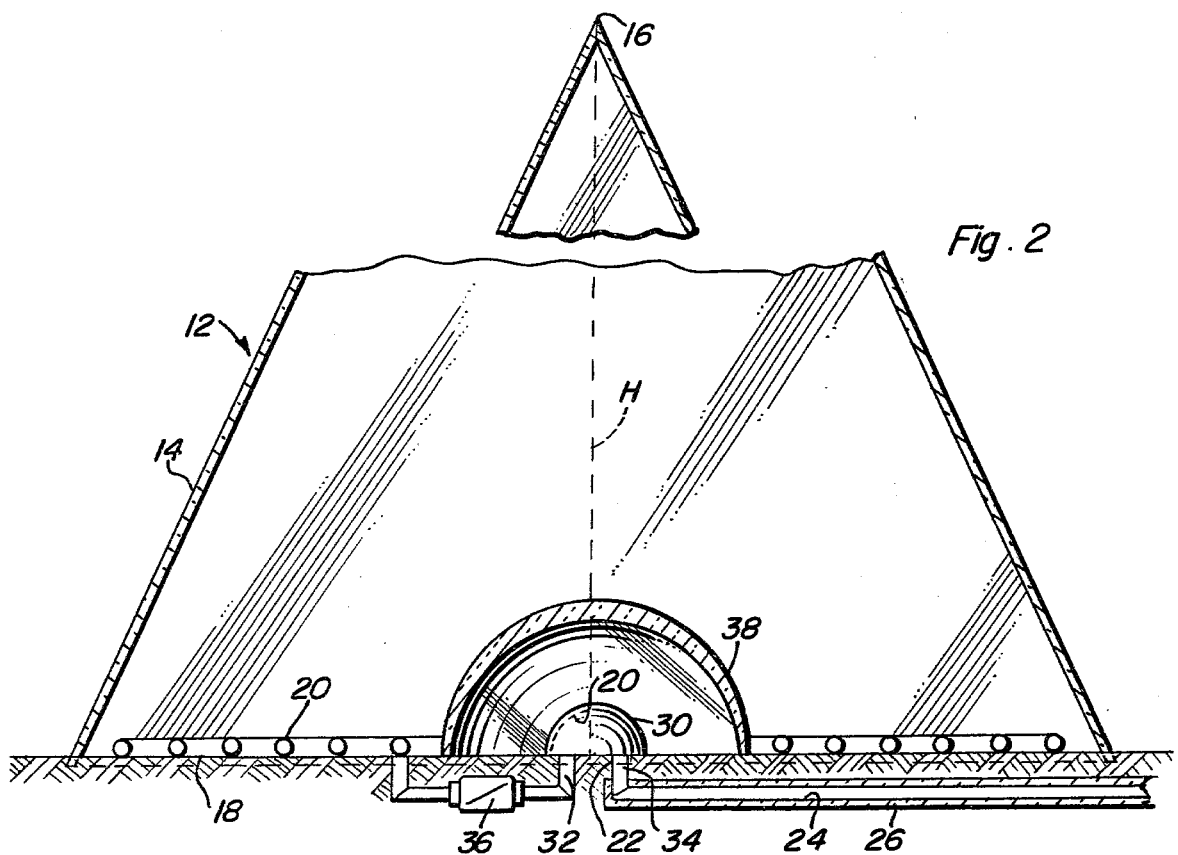

Referring now to FIGS. 1 and 2, the present solar energy unit is seen at 10 to comprise a housing 12 preferably formed into the shape of a pyramid. The housing 12 is seen to have triangular walls 14, the vertices of the walls 14 joining to form an apex 16 of the housing 12. The sides of each wall 14 join the adjacent sides of each adjacent wall 14, the lower sides of each wall 14 being joined to a base 18. The housing 12 is thus sealed from ambient. According to the invention, the height of the pyramidal housing 12, designated as H in the drawings, and the base line B as shown in the drawings have a definite mathematical relationship to the value $\pi$. The base line B is taken to be the length of a line between the geometrical center of the base 18, the base 18 being a square, and any one of the sides of said base 18, the base line B being perpendicular to the side of the base 18 to which said base line B is drawn. The dimensions of the pyramidal housing must be conform to the following proportion:

$$2H \div B/2 = \pi$$

Solar energy collection and concentration by the pyramidal housing 12 is substantially enhanced by forming said housing 12 in the above proportion.

A fluid inlet line 20 extends into the housing 12 and is formed into a pattern disposed on the upper surface of the base 18 to maximize the length of said line 20 in order to afford a greater opportunity for heat transfer through the walls of the line 20, the line 20 being preferably formed of a material such as copper which has high heat conductivity properties. The line 20 is seen to exit the pyramidal housing 12 at 22, the line 20 at the point 22 comprising a fluid outlet duct 24 which is preferably insulated by insulating material 26. The fluid inlet line 20 and fluid outlet duct 24 are sealed about the exterior walls thereof at the points of entry into the housing 12, such that the housing 12 is sealed from ambient at the points of entry and exit of said fluid-bearing lines.

A heat chamber 28 is seen to be provided within the interior of the housing 12, the heat chamber 28 being defined by a transparent dome 30 centrally located on the base 18. The transparent dome 30 is sealed to the upper surface of the base 18 and essentially forms a portion of the fluid line 20 within the interior of said housing 12. Fluid circulating within the interior of the housing 12 enters the heat chamber 28 through inlet 32 and exits said chamber through outlet 34. A check valve 36 is disposed in the line 20 downstream of the inlet 32. A magnifying dome 38 is disposed in surmounting relation to the transparent dome 30, the magnifying dome being formed of a transparent material which magnifies solar radiation received through the walls 14 of the pyramidal housing 12 into the heat chamber 28. The magnifying dome 38 is also centrally located on the upper surface of the base 18, the shortest distance between any point on the exterior surface of the transparent dome 30 and the exterior surface of the magnifying dome 38 being the focal length F, the magnifying dome 38 concentrating heat energy within the heat chamber 28.

It can thus be seen that a fluid flowing through the interior of the pyramidal housing 12 is caused to absorb heat in at least two ways. Firstly, heat is absorbed by the fluid through the walls of the fluid line 20. Secondly, the concentrated energy being directed into the heat chamber 28 further elevates the temperature of the fluid as said fluid passes through the heat chamber 28. The heated fluid passing from the heat chamber 28 through the outlet 34 is directed exteriorly of the pyramidal housing 12 by means of the outlet duct 24. The heated fluid is then used as a source of energy in a known fashion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Solar collection apparatus comprising:
   a transparent sealed housing formed into the shape of a pyramid;
   means for circulating a fluid through at least a portion of the interior of the housing comprising an inlet line entering the housing and being sealed at the entry loci; an outlet duct exiting the housing and being sealed at the exit loci; means for sealably housing and transporting the fluid within the housing, said means having walls formed of heat conductive material;
   a transparent dome disposed centrally of the housing on the plane of the base of the pyramid defining said housing, solar radiation being concentrated within a heat chamber defined by said transparent dome;
   means for directing the fluid into the heat chamber from the housing and transporting means, means for directing the fluid from the heat chamber to the outlet duct and magnifying means disposed centrally of the housing on the plane of the base of the pyramid defining said housing, said magnifying means surmounting and being spaced from the transparent dome for concentrating energy within the heat chamber.

2. The solar collection apparatus of claim 1, wherein the dimensions of the housing are proportioned according to:

$$2H \div B/2 = \pi$$

wherein:
   $H$ = the height of the housing;
   $B$ = the length of a line normal to a lower side edge of the housing and intersecting the line defining the height of the housing, said line lying in the plane of the base of the pyramid defining said housing; and,
   $\pi$ = a constant.

3. The solar collection apparatus of claim 1, and further comprising insulation means located on the outlet duct.

4. The solar collection apparatus of claim 1, wherein the magnifying means comprises a transparent dome, the focal length of said magnifying means being the shortest distance between a given point on the exterior surface of the first-mentioned dome and a point on the surface of the magnifying means.

5. The solar collection apparatus of claim 1, and further comprising a check valve disposed in the housing and transporting means upstream of the heat chamber to control flow of fluid into said heat chamber.

* * * * *